United States Patent
Abe

(10) Patent No.: US 11,186,210 B2
(45) Date of Patent: Nov. 30, 2021

(54) CONVEYANCE SEAT

(71) Applicant: TS TECH CO., LTD., Saitama (JP)

(72) Inventor: Ryuzaburo Abe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/643,911

(22) PCT Filed: Sep. 3, 2018

(86) PCT No.: PCT/JP2018/032638
§ 371 (c)(1),
(2) Date: Mar. 3, 2020

(87) PCT Pub. No.: WO2019/049831
PCT Pub. Date: Mar. 14, 2019

(65) Prior Publication Data
US 2020/0269737 A1 Aug. 27, 2020

(30) Foreign Application Priority Data
Sep. 5, 2017 (JP) .............................. JP2017-170610

(51) Int. Cl.
*B60N 2/56* (2006.01)
*A47C 7/74* (2006.01)
*B60N 2/58* (2006.01)

(52) U.S. Cl.
CPC ......... *B60N 2/5657* (2013.01); *B60N 2/5635* (2013.01); *A47C 7/74* (2013.01);
(Continued)

(58) Field of Classification Search
CPC .. B60N 2/5657; B60N 2/5642; B60N 2/5635; B60N 2/5825; B60N 2/56; B60N 2/58
See application file for complete search history.

(56) References Cited

U.S. PATENT DOCUMENTS

| | | | |
|---|---|---|---|
| 7,597,398 B2* | 10/2009 | Lindsay | B60N 2/0224 297/283.2 |
| 7,931,330 B2* | 4/2011 | Itou | B60N 2/5635 297/180.14 |

(Continued)

FOREIGN PATENT DOCUMENTS

| | | |
|---|---|---|
| CN | 1937939 A | 3/2007 |
| EP | 1757207 A1 | 2/2007 |

(Continued)

OTHER PUBLICATIONS

International Search Report dated Nov. 13, 2018 for the PCT application No. PCT/JP2018/032638, with English machine translation.

(Continued)

*Primary Examiner* — Syed A Islam
(74) *Attorney, Agent, or Firm* — Michael Best & Friedrich LLP

(57) ABSTRACT

A seat cushion S1 of a vehicle seat S includes: a pad member 10 including a base pad 11 and an intermediate pad 12 overlapped on the base pad 11; a fan 31 provided so that air passes through the pad member 10; air passage holes 11*h* and 12*h* respectively formed in the base pad 11 and the intermediate pad 12; and a pull-in hole provided at a position different from the air passage hole 12*h* in the intermediate pad 12 and a position of the intermediate pad 12 with respect to the base pad 11 is held in such a manner that a skin pull-in trim cord enters the pull-in hole while the intermediate pad 12 is overlapped on the base pad 11 so that the air passage holes 11*h* and 12*h* communicate with each other.

7 Claims, 11 Drawing Sheets

(52) U.S. Cl.
CPC .............. *B60N 2/56* (2013.01); *B60N 2/5642* (2013.01); *B60N 2/5685* (2013.01); *B60N 2/58* (2013.01); *B60N 2/5825* (2013.01)

(56) References Cited

U.S. PATENT DOCUMENTS

| | | |
|---|---|---|
| 2005/0280294 A1 | 12/2005 | Ishima et al. |
| 2006/0060344 A1* | 3/2006 | Esaki ................. B60H 1/00285 165/287 |
| 2009/0079236 A1 | 3/2009 | Itou et al. |
| 2016/0207431 A1 | 7/2016 | Abe et al. |
| 2017/0274804 A1 | 9/2017 | Abe et al. |
| 2019/0031059 A1 | 1/2019 | Abe et al. |

FOREIGN PATENT DOCUMENTS

| | | |
|---|---|---|
| JP | 2012-000336 A | 1/2012 |
| JP | 2013-147225 A | 8/2013 |
| JP | 2013-184625 A | 9/2013 |
| WO | 2015/030195 A1 | 3/2015 |

OTHER PUBLICATIONS

Office Action issued in Chinese Application No. 201880056624.1, dated Sep. 22, 2021, with English machine translation.

* cited by examiner

CONVEYANCE SEAT

CROSS-REFERENCE TO RELATED APPLICATIONS

This application is entering into the national phase of PCT Application No. PCT/JP2018/032638, filed on Sep. 3, 2018. Further, this application claims the benefit of priority from Japanese Application No. 2017-170610, filed on Sep. 5, 2017, the entire contents of which are incorporated herein by reference.

TECHNICAL FIELD

The present invention relates to a conveyance seat and particularly to a conveyance seat provided with a blower for sending air into a pad member in the seat.

BACKGROUND ART

Hitherto, a conveyance seat provided with a blower for sending air into a pad member in the seat is known. Among such conveyance seats, one in which the pad member is divided into a plurality of pieces (pad pieces) in the thickness direction exists (for example, see PATENT LITERATURE 1).

In a conveyance seat described in PATENT LITERATURE 1, a pad member (referred to as a "pad main body" in PATENT LITERATURE 1) constituting a cushion seat is divided into two upper and lower pad pieces (referred to as a "first main body and a second main body" in PATENT LITERATURE 1) and each of them is provided with an air passage hole (a blowing port) for air sent by a blower. Then, two upper and lower pad pieces are overlapped so that their blowing ports communicate with each other, thereby constituting the pad member.

CITATION LIST

Patent Literature

PATENT LITERATURE 1: WO 2015/030195 A

SUMMARY OF INVENTION

Technical Problem

As in the conveyance seat described in PATENT LITERATURE 1, when the pad member is formed by overlapping a plurality of pad pieces each having air passage holes, there is a possibility that the pad pieces may be displaced when the seat is used. When the pad pieces are displaced, the air passage holes respectively formed in the pad pieces are also displaced from each other. As a result, there is concern that air sent by the blower cannot appropriately pass through the pad member.

Further, among the conveyance seats, a seat capable of changing a seat length in a predetermined direction by deforming a pad member is known. When the pad member is divided into a plurality of pad pieces in such a seat, the pad pieces are easily displaced when the pad member is deformed. Thus, the above-described problems become more significant.

Here, the present invention has been made in view of the above-described problems and an object thereof is to provide a conveyance seat capable of suppressing a displacement between pad pieces constituting a pad member when the seat is used.

Further, another object of the present invention is to suppress a displacement between pad pieces constituting a pad member in a seat configuration capable of changing a seat length in a predetermined direction by deforming the pad member.

Solution to Problem

According to the conveyance seat of the present invention, the above-described problems are solved by a conveyance seat with a support surface supporting a seated occupant, including: a pad member including a first pad piece and a second pad piece overlapped on the first pad piece at a position closer to the support surface than the first pad piece; a blower provided so that air passes through the pad member; an air passage hole formed in each of the first pad piece and the second pad piece to penetrate in a thickness direction of the pad member and allowing air sent by the blower to pass therethrough; a concave portion provided at a position different from the air passage hole in the second pad piece; and a position holding member entering the concave portion while the second pad piece is overlapped on the first pad piece so that the air passage hole of the first pad piece communicates with the air passage hole of the second pad piece to hold a position of the second pad piece with respect to the first pad piece.

In the conveyance seat of the present invention with the above-described configuration, since the position holding member (a member different from the first pad piece and the second pad piece) enters the concave portion formed in the second pad piece, it is possible to hold the position of the second pad piece with respect to the first pad piece while the air passage holes of the first pad piece and the second pad piece communicate with each other. In such a configuration, it is possible to suppress the second pad piece from being displaced with respect to the first pad piece when the seat is used. As a result, it is possible to satisfactorily maintain a state in which air sent from the blower smoothly passes through the pad member.

Further, the conveyance seat may further include a skin covering the pad member, the concave portion may be a pull-in hole formed in the second pad piece to suspend a part of the skin, the position holding member may be a pull-in member attached to a part of the skin to suspend a part of the skin in the pull-in hole, and the pull-in member may be fixed while entering the pull-in hole.

In the above-described configuration, it is possible to suppress the second pad piece from being displaced with respect to the first pad piece when the seat is used by using the pull-in member for suspending the skin in the pull-in hole as the position holding member.

Further, the conveyance seat may include a duct connected to the blower and forming a flow passage of air sent by the blower and a front end portion of the duct may be located outside the pad member and be connected to an opening of the air passage hole of the first pad piece.

In the above-described configuration, since the front end portion of the duct is located outside the pad member, it is possible to easily install the duct without interference with the pad member. Further, since the front end portion of the duct is connected to the opening of the air passage hole of the first pad piece, air sent by the blower appropriately pass through the air passage hole of the first pad piece through the duct.

Further, the conveyance seat may include a movement member configured to move in an intersection direction intersecting the thickness direction to change a length of the pad member in the intersection direction and an end portion of the first pad piece in the intersection direction may be attached to the movement member and be deformed so that the length is changed in accordance with a movement of the movement member.

In the above-described configuration, the end portion of the first pad piece is deformed (moved) when changing the length of the pad member in the intersection direction. Also in such a configuration, the position of the second pad piece with respect to the first pad piece is held by the position holding member. That is, according to the above-described configuration, it is possible to suppress the second pad piece from being displaced with respect to the first pad piece when changing the seat length in the intersection direction by deforming the pad member.

Further, in the conveyance seat, the intersection direction may be a front to back direction of the conveyance seat and the concave portion and the position holding member may extend in a width direction of the conveyance seat.

When the concave portion and the position holding member extend in the seat width direction as described above, it is possible to effectively suppress the second pad piece from being displaced with respect to the first pad piece in the front to back direction.

Alternatively, in the conveyance seat, the intersection direction may be a front to back direction of the conveyance seat, the concave portion may include a first portion extending in the front to back direction and a second portion extending in a direction inclined with respect to the front to back direction, and the position holding member may enter each of the first portion and the second portion.

As described above, when the concave portion includes the first portion extending in the front to back direction and the second portion extending in a direction inclined with respect to the front to back direction and the position holding member enters both the first portion and the second portion, it is possible to effectively suppress the second pad piece from being displaced with respect to the first pad piece.

Further, in the conveyance seat, the concave portion may be a through-hole penetrating the second pad piece in the thickness direction, the first pad piece may be provided with a communication concave portion formed in the thickness direction and communicating with the through-hole, the communication concave portion may communicate with the through-hole while the second pad piece is overlapped on the first pad piece so that the air passage hole of the first pad piece communicates with the air passage hole of the second pad piece, and the position holding member may enter both the communication concave portion and the through-hole communicating with each other.

In the above-described configuration, since the position holding member enters both the concave portion (the through-hole) of the second pad piece and the communication hole of the first pad piece, it is possible to more effectively suppress the displacement between the first pad piece and the second pad piece.

Further, in the conveyance seat, the first pad piece may be provided with a recess formed to fit the second pad piece thereinto and the second pad piece may be overlapped on the first pad piece while the second pad piece is fitted into the recess.

In the above-described configuration, the second pad piece is fitted into the recess formed in the first pad piece when the second pad piece is overlapped on the first pad piece. In such a configuration, it is possible to more easily perform an operation of assembling the pad member by overlapping the second pad piece on the first pad piece.

Advantageous Effects of Invention

According to the conveyance seat of the present invention, it is possible to suppress the second pad piece from being displaced with respect to the first pad piece when the seat is used.

Further, according to the conveyance seat of the present invention, it is possible to suppress the second pad piece from being displaced with respect to the first pad piece when the seat is used by using the pull-in member for suspending the skin in the pull-in hole as the position holding member.

Further, according to the conveyance seat of the present invention, it is possible to easily install the duct without interference with the pad member. Further, air sent by the blower appropriately passes through the air passage hole of the first pad piece through the duct.

Further, according to the conveyance seat of the present invention, it is possible to suppress the second pad piece from being displaced with respect to the first pad piece when changing the seat length in a predetermined direction by deforming the pad member.

Further, according to the conveyance seat of the present invention, it is possible to effectively suppress the second pad piece from being displaced with respect to the first pad piece in the front to back direction.

Further, according to the conveyance seat of the present invention, it is possible to effectively suppress the second pad piece from being displaced with respect to the first pad piece.

Further, according to the conveyance seat of the present invention, since the position holding member enters both the concave portion (the through-hole) of the second pad piece and the communication hole of the first pad piece, it is possible to more effectively suppress the displacement between the first pad piece and the second pad piece.

Further, according to the conveyance seat of the present invention, it is possible to more easily perform an operation of assembling the pad member by overlapping the second pad piece on the first pad piece.

DESCRIPTION OF EMBODIMENTS

Hereinafter, a conveyance seat according to an embodiment (the embodiment) of the present invention will be described. However, the embodiment to be described below is used to easily understand the present invention and does not limit the present invention. That is, the present invention can be modified and improved without departing from the spirit and the equivalent thereof is, of course, included in the present invention.

Hereinafter, a vehicle seat will be described as an example of the conveyance seat according to the embodiment. However, the conveyance seat of the present invention may be a seat mounted on a conveyance other than a vehicle, for example, a seat mounted on a ship or an aircraft.

Further, in the description below, the "front to back direction" is the front to back direction of the vehicle seat and is a direction matching the traveling direction of the vehicle. Further, the "seat width direction" is the width direction of the vehicle seat and corresponds to the right and left direction when viewed from a seated occupant. Further, the "up to down direction" is the up to down direction of the vehicle seat mounted in the vehicle, in other words, the seat height direction.

Further, when describing the position, posture, and state of each part of the seat, a description will be made on the assumption that the vehicle seat is mounted in the vehicle. In such a case, the front to back direction corresponds to the intersection direction intersecting the thickness direction of a seat cushion S1 (in other words, the thickness direction of a pad member 10 in the seat cushion S1).

<<Basic Configuration of Vehicle Seat According to the Embodiment>>

Figure 1:
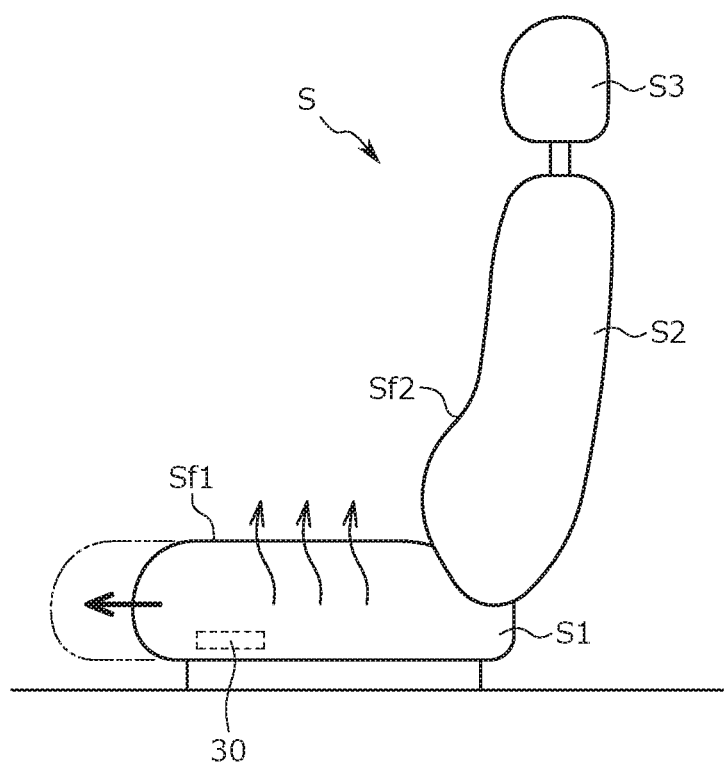
FIG. 1 is a side view of a conveyance seat according to an embodiment of the present invention.

A basic configuration of the vehicle seat (hereinafter, a vehicle seat S) according to the embodiment will be described with reference to FIG. 1. FIG. 1 is a side view of the vehicle seat S.

The vehicle seat S includes, as illustrated in FIG. 1, a seat cushion S1, a seat back S2, and a headrest S3. The seat cushion S1 and the seat back S2 are configured by supporting a pad member having a cushioning property such as urethane by a frame and covering a surface of the pad member with a skin.

Further, the seat cushion S1 and the seat back S2 respectively include support surfaces Sf1 and Sf2 which support a seated occupant (specifically, an occupant of the vehicle). Specifically, an upper surface of the seat cushion S1 is provided with the support surface Sf1 which supports the buttocks of the seated occupant. A front surface of the seat back S2 is provided with the support surface Sf2 which supports the back of the seated occupant.

Further, the vehicle seat S includes a blowing unit 30 provided below the seat cushion S1. The blowing unit 30 is a device for allowing air (wind) to pass through the seat cushion S1. When the blowing unit 30 is activated while the seated occupant sits on the vehicle seat S, the air sent from the blowing unit 30 passes through the seat cushion S1 and finally passes through the upper surface of the seat cushion S1 (that is, the support surface Sf1). Additionally, the blowing unit 30 may suck air existing around the upper surface of the seat cushion S1 and may discharge the air to the lower side of the seat cushion S1 through the seat cushion S1.

Further, in the vehicle seat S, the front end portion of the seat cushion S1 is movable in a telescopic manner. Specifically, in the embodiment, the front end portion of the seat cushion S1 is movable forward and backward in a telescopic manner. Accordingly, the length of the seat cushion S1 in the front to back direction (hereinafter, referred to as a "longitudinal cushion length") can be changed. Accordingly, the longitudinal cushion length can be changed according to the physique of the seated occupant and the seat cushion S1 can be expanded to a position indicated by a dashed line of FIG. 1.

Additionally, a longitudinal cushion length adjustment unit 40 which is a device operated when changing the longitudinal cushion length is disposed in the seat cushion S1. The longitudinal cushion length adjustment unit 40 will be described in detail in the following section.

<<Blowing Unit and Longitudinal Cushion Length Adjustment Unit>>

Figure 2:
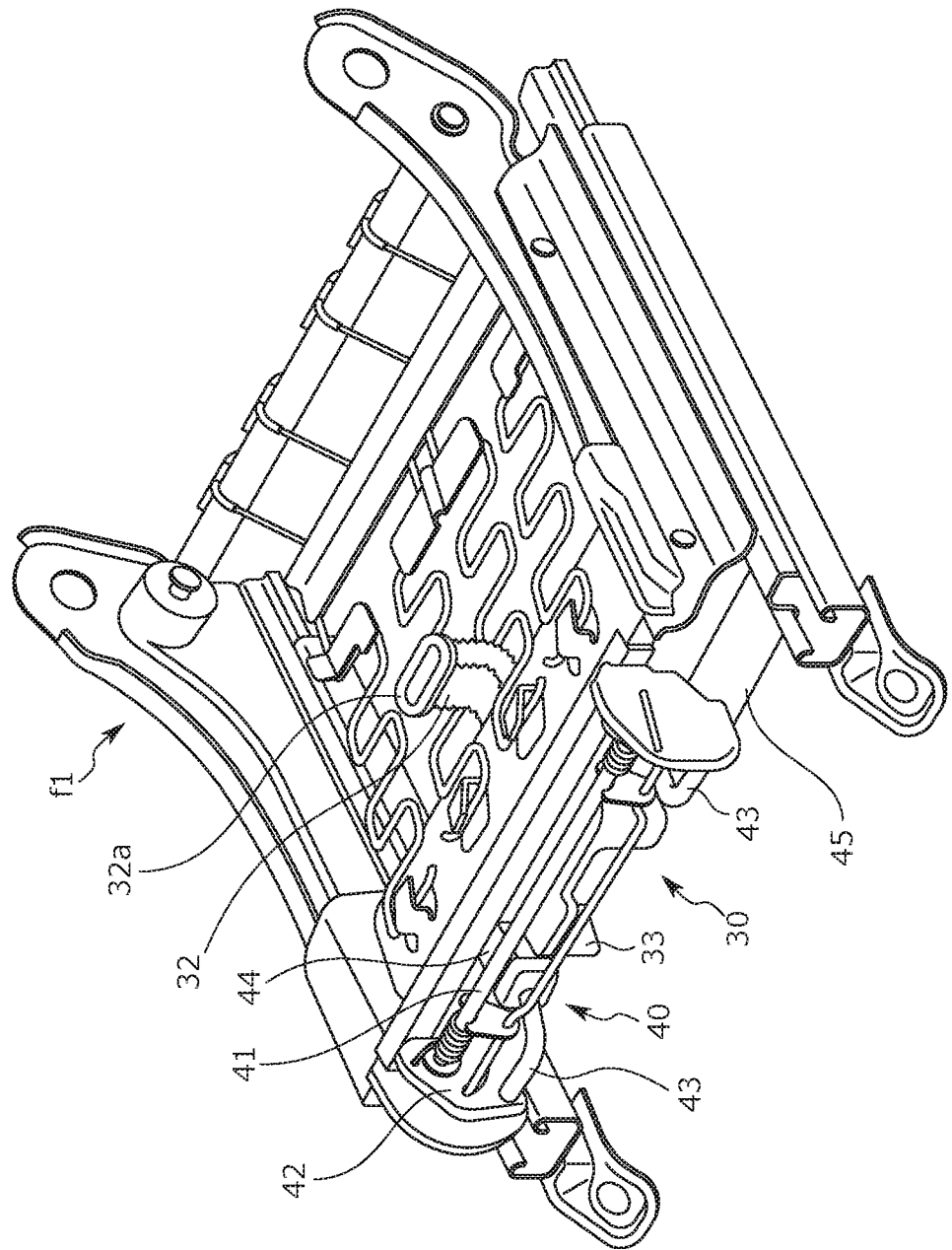
FIG. 2 is a perspective view of a seat cushion frame.
Figure 3:
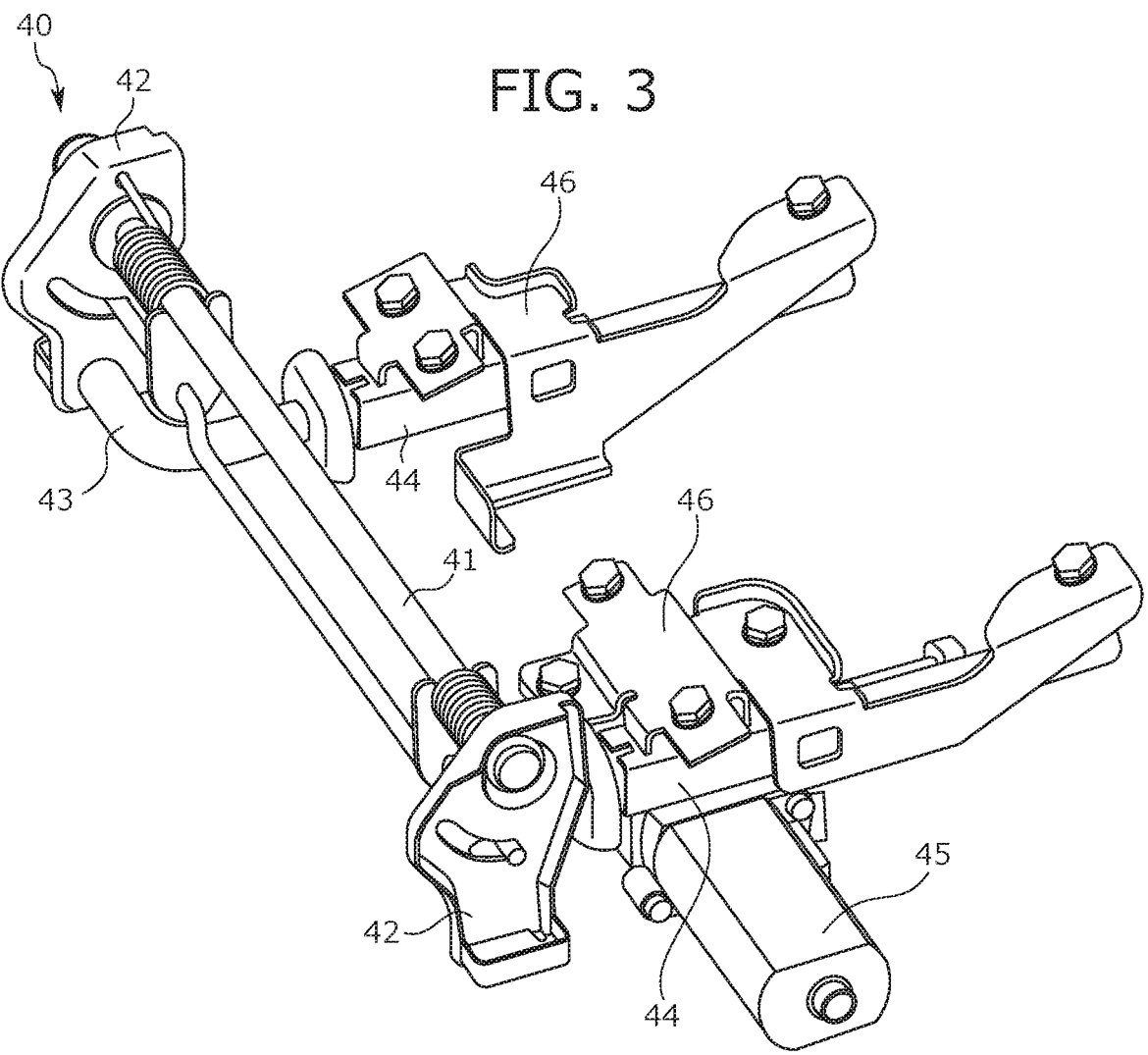
FIG. 3 is a diagram illustrating a configuration of a blowing unit and a longitudinal cushion length adjustment unit.
Figure 3:
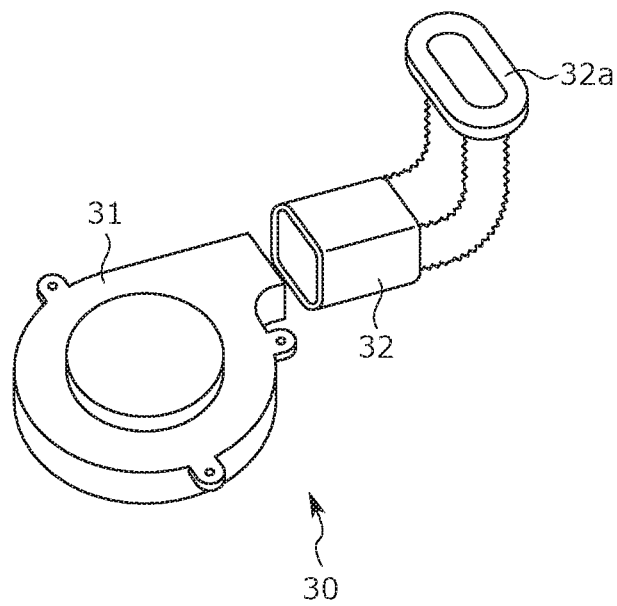
Figure 4:
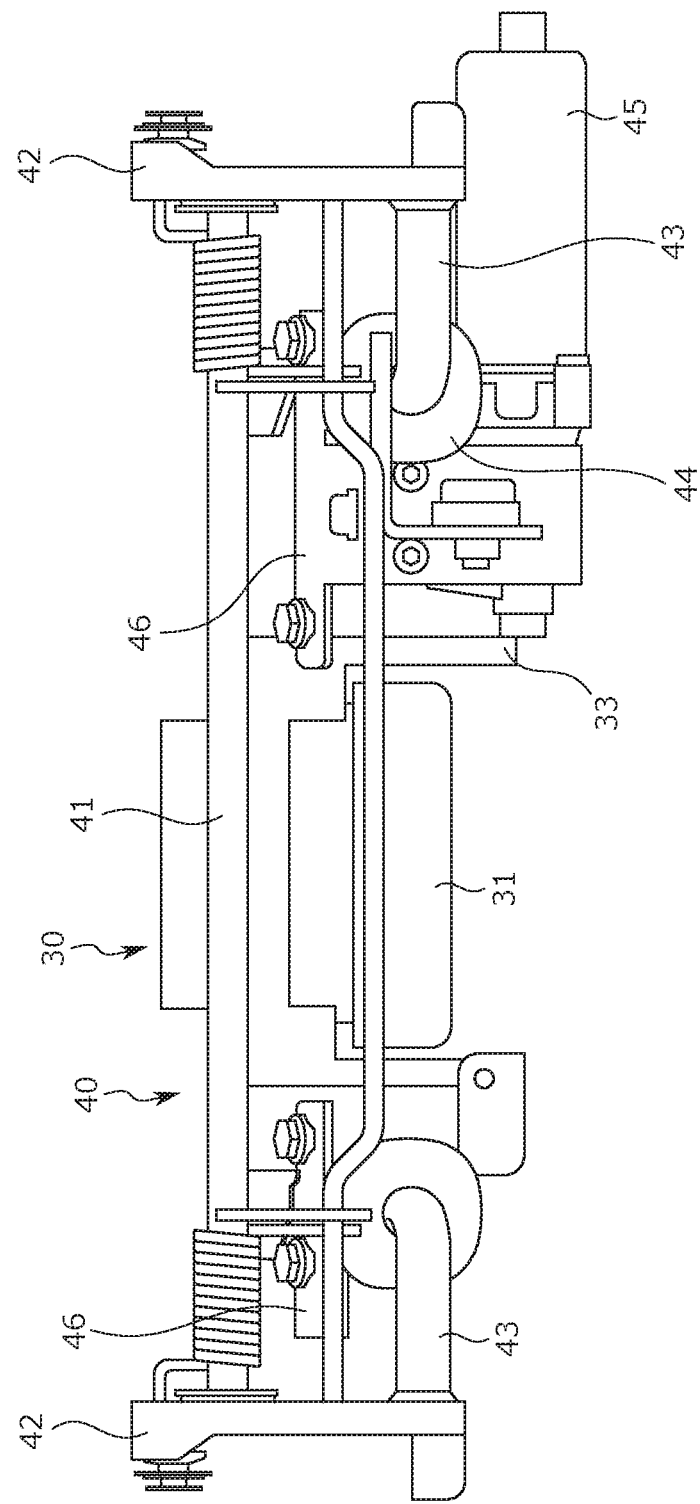
FIG. 4 is a diagram illustrating the blowing unit and the longitudinal cushion length adjustment unit attached to a seat cushion when viewed from the front side.
Figure 5:
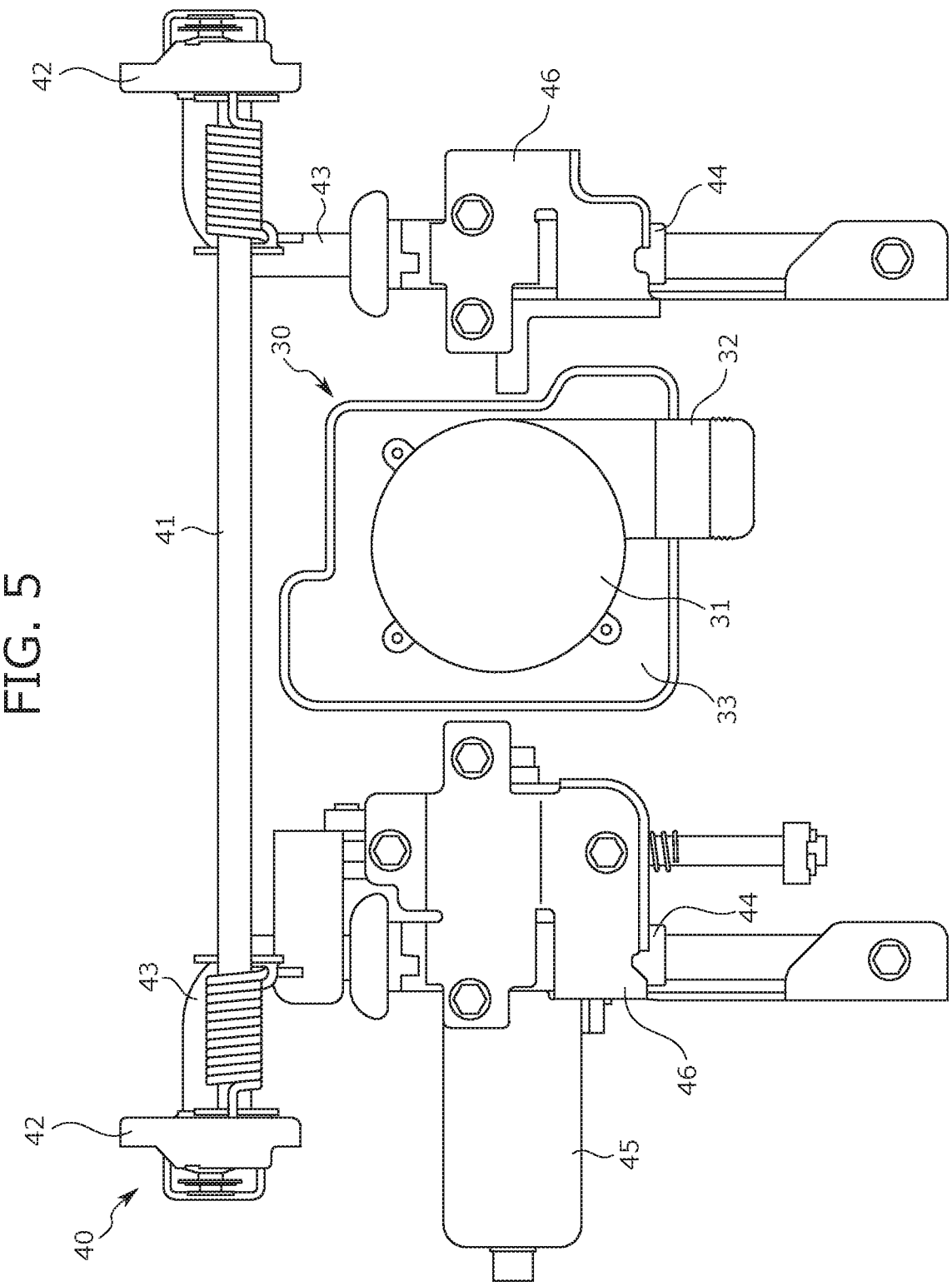
FIG. 5 is a diagram illustrating the blowing unit and the longitudinal cushion length adjustment unit attached to the seat cushion when viewed from below.
Figure 6A:
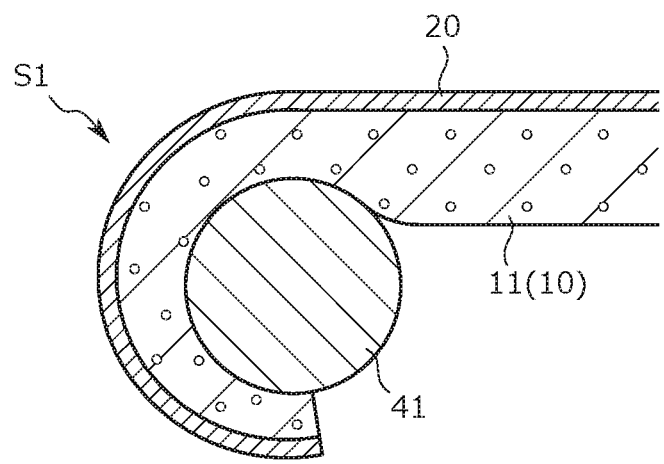
FIG. 6A is a (first) diagram illustrating a state before and after a change in longitudinal cushion length.
Figure 6B:
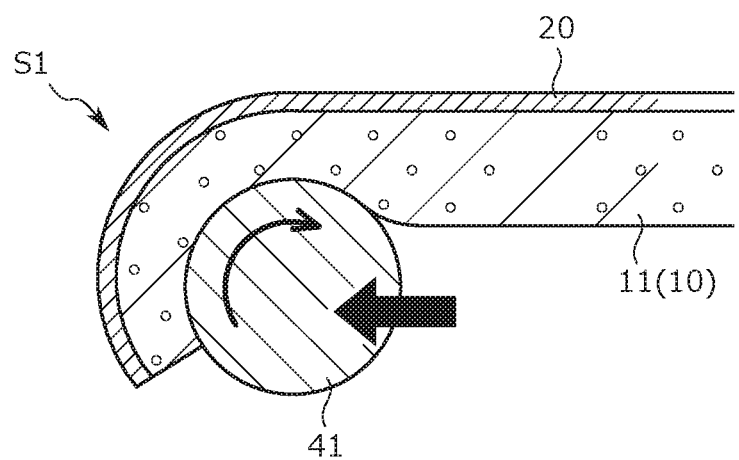
FIG. 6B is a (second) diagram illustrating a state before and after a change in longitudinal cushion length.

Next, the blowing unit 30 and the longitudinal cushion length adjustment unit 40 will be described with reference to FIGS. 2 to 6B. FIG. 2 is a perspective view of a seat cushion frame f1 of the seat cushion S1. FIG. 3 is a diagram illustrating a configuration of the blowing unit 30 and the longitudinal cushion length adjustment unit 40. FIGS. 4 and 5 are diagrams illustrating the blowing unit 30 and the longitudinal cushion length adjustment unit 40 attached to the seat cushion S1, FIG. 4 is a diagram illustrating each unit when viewed from the front side, and FIG. 5 is a diagram illustrating each unit when viewed from below. FIGS. 6A and 6B are diagrams illustrating a state before and after a change in longitudinal cushion length, which is a diagram schematically illustrating a side cross-section of the seat cushion S1. Additionally, FIG. 6A illustrates a state in which the longitudinal cushion length is a normal length and FIG. 6B illustrates a state in which the longitudinal cushion length becomes an expanded length.

The blowing unit 30 and the longitudinal cushion length adjustment unit 40 are attached to the lower portion of the seat cushion S1. More specifically, the blowing unit 30 and the longitudinal cushion length adjustment unit 40 are attached to, as illustrated in FIG. 2, the lower end portion of the front portion of the seat cushion frame f1.

Hereinafter, a configuration of each of the blowing unit 30 and the longitudinal cushion length adjustment unit 40 will be described.

(Blowing Unit 30)

The blowing unit 30 includes, as illustrated in FIG. 3, a fan 31 and a duct 32. The fan 31 corresponds to a blower and is a device for allowing air to pass through the seat cushion S1 (specifically, the pad member 10 provided in the seat cushion S1). The fan 31 is attached to the front end portion of the seat cushion frame f1 through a fan mounting bracket 33 illustrated in FIG. 2 or 4.

The duct 32 is a cylindrical member that constitutes a flow passage of air sent by the fan 31. The duct 32 is bent substantially in an L shape as illustrated in FIG. 3 and is connected to the fan 31 at one end portion. Further, the other end portion of the duct 32 (the end portion opposite to the connection side to the fan 31) is flexible and has a bellows shape. A flange 32a having a flange shape is attached to a front end portion of the end portion of the duct 32 having a bellows shape. The flange 32a is provided with a through-hole communicating with the inside of the duct 32. The duct 32 is disposed so that the through-hole formed in the flange 32a faces upward as illustrated in FIG. 2.

Additionally, in the embodiment, the duct 32 is located on the outside (precisely, the lower side) in relation to the pad member 10 inside the seat cushion S1 in the up to down direction and is disposed in a state in which the flange 32a contacts the lower surface of the pad member 10. A position between the duct 32 and the pad member 10 will be described again in the following section.

(Longitudinal Cushion Length Adjustment Unit 40)

The longitudinal cushion length adjustment unit 40 moves in the front to back direction when changing the longitudinal cushion length. At this time, the front end portion of the pad member 10 in the seat cushion S1 is deformed so that the longitudinal length of the pad member 10 (the length in the front to back direction) changes. As a result, the longitudinal cushion length changes. That is, the longitudinal cushion length adjustment unit 40 moves forward and backward in order to change the longitudinal length of the pad member 10.

The longitudinal cushion length adjustment unit 40 includes, as illustrated in FIGS. 2 to 5, a rotation shaft 41, a shaft support bracket 42, a reciprocating rod 43, a guide pillar 44, and a motor 45.

The rotation shaft 41 is configured as a metallic shaft member extending in the seat width direction. Further, as illustrated in FIGS. 6A and 6B, a skin 20 covering the front end portion of the pad member 10 (precisely, a front end portion of a base pad 11 to be described later) and the front end portion of the pad member 10 is wound on the outer peripheral portion of the rotation shaft 41. Further, the rotation shaft 41 is rotatable around an axis following the seat width direction. Then, when the rotation shaft 41 rotates, the winding amount of the pad member 10 and the skin 20 wound on the outer peripheral portion of the rotation shaft 41 changes in accordance with the rotation. In other words, the rotation shaft 41 rotates so as to deform the front end portion of the pad member 10 (specifically, the front end portion of the base pad 11).

The shaft support bracket 42 is a metal plate which rotatably supports both end portions of the rotation shaft 41. The reciprocating rod 43 is configured as a rod-shaped body which is made of metal or resin and a pair of rods is provided at positions separated in the seat width direction as illustrated in FIGS. 3 to 5. Each reciprocating rod 43 extends in an elongated state in the front to back direction as illustrated in FIG. 5. Further, the front end portion of each reciprocating rod 43 is bent in an L shape outward in the seat width direction and is assembled to the shaft support bracket 42 as illustrated in FIG. 5.

The guide pillar 44 is a cylindrical body that accommodates the reciprocating rod 43 in an insertable and removable manner and a pair of guide pillars is provided at positions separated in the seat width direction similarly to the reciprocating rod 43. Each guide pillar 44 extends in an elongated state in the front to back direction. Further, apart of a portion extending in the front to back direction of the reciprocating rod 43 is inserted into each guide pillar 44 so as to movable forward and backward in the front to back direction. Further, each guide pillar 44 is fixed to the lower end of the seat cushion frame f1 by a bolt through the pillar mounting bracket 46.

The guide pillar 44 allows the reciprocating operation of the reciprocating rod 43 in the front to back direction and regulates the movement in the other directions. As a structure of such a guide pillar 44, for example, a structure simulating a cylindrical guide member into which a pillar portion of a general headrest is inserted can be used.

The motor 45 rotates in order to reciprocate the reciprocating rod 43. Specifically, the rotation of the motor 45 is transmitted by a driving force transmission mechanism such as a gear. A final gear of the driving force transmission mechanism is threaded into a screw portion formed in an outer peripheral portion of one of the pair of right and left reciprocating rods 43. With such a configuration, when the motor 45 rotates, the driving force (the rotating force) is transmitted to the reciprocating rod 43 with the screw portion. As a result, the reciprocating rod 43 moves in a reciprocating manner in the front to back direction. Additionally, the motor 45 is rotatable in both forward and reverse directions. When the motor 45 rotates in the forward direction, the reciprocating rod 43 moves forward. In contrast, when the motor 45 rotates in the reverse direction, the reciprocating rod 43 moves backward.

Then, when the reciprocating rod 43 moves forward and backward in the front to back direction, the shaft support bracket 42 fixed to the reciprocating rod 43 and the rotation shaft 41 supported by the shaft support bracket 42 move together forward and backward along with the reciprocating rod 43. At this time, the rotation shaft 41 moves forward and backward in a rotation state. Accordingly, as understood from FIGS. 6A and 6B, the winding amount of the pad member 10 and the skin 20 wound on the outer peripheral portion of the rotation shaft 41 changes.

As described above, when the rotation shaft 41 moves forward and backward so that the winding amount of the pad member 10 and the skin 20 wound on the outer peripheral portion of the rotation shaft 41 changes, the longitudinal cushion length changes.

Additionally, the rotation shaft 41, the shaft support bracket 42, and the reciprocating rod 43 correspond to a movement member that moves forward and backward in order to change the longitudinal cushion length (in other words, the longitudinal length of the pad member 10).

Further, a slight space is provided between the pair of right and left guide pillars 44 in the seat width direction. In the embodiment, as illustrated in FIGS. 4 and 5, the fan 31 is disposed by using a space between the guide pillars 44. That is, in the embodiment, the fan 31 is provided between the pair of right and left guide pillars 44.

<<Detailed Configuration of Seat Cushion>>

Figure 7:
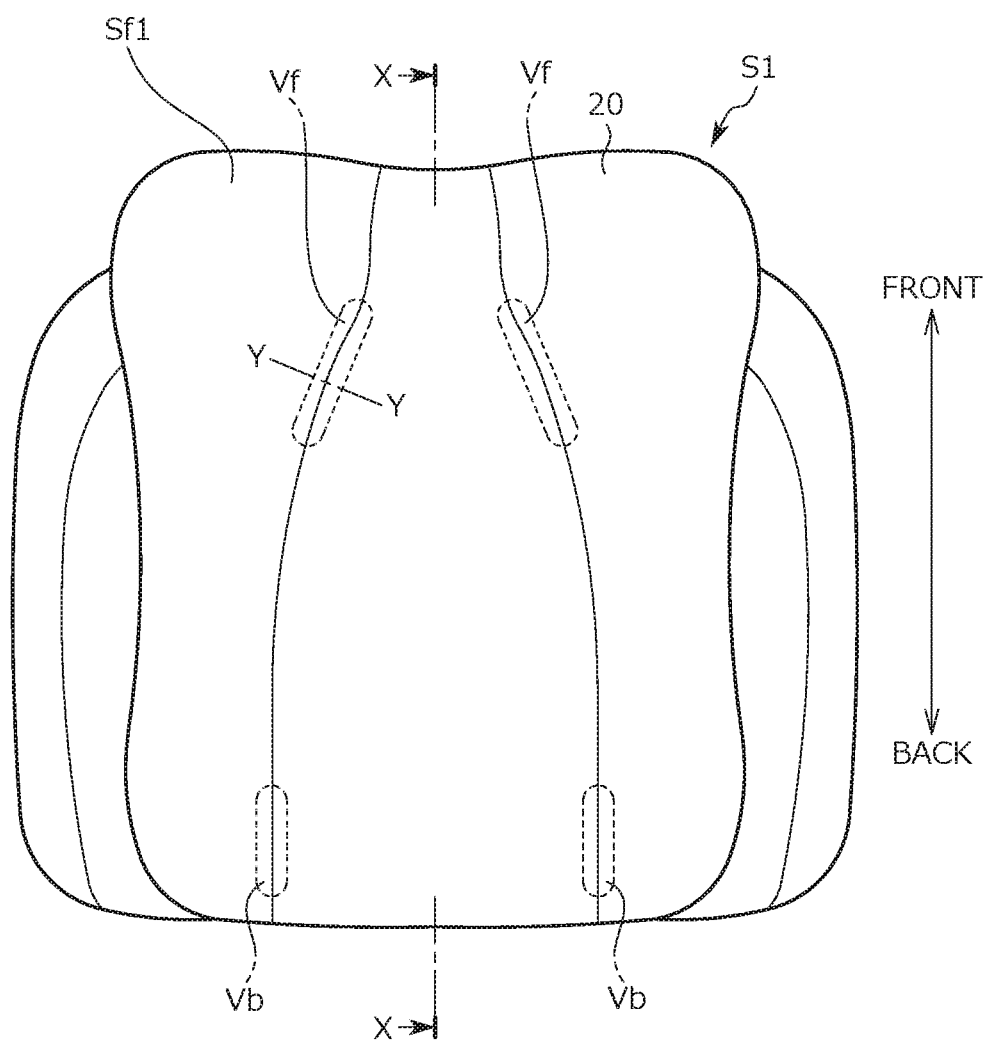
FIG. 7 is a plan view of the seat cushion.
Figure 8:
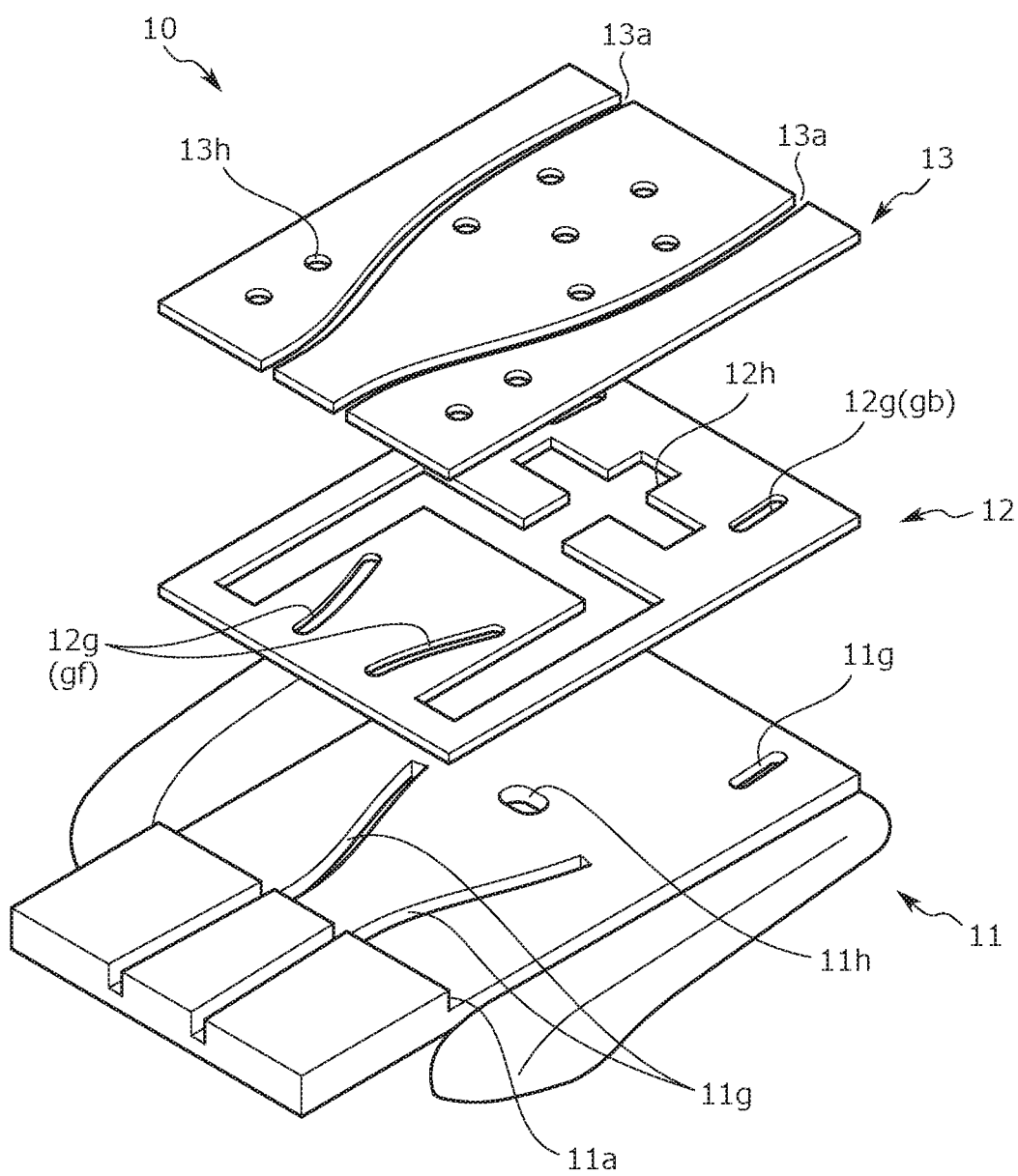
FIG. 8 is a diagram illustrating a state in which a pad member is disassembled into pad pieces.
Figure 9:
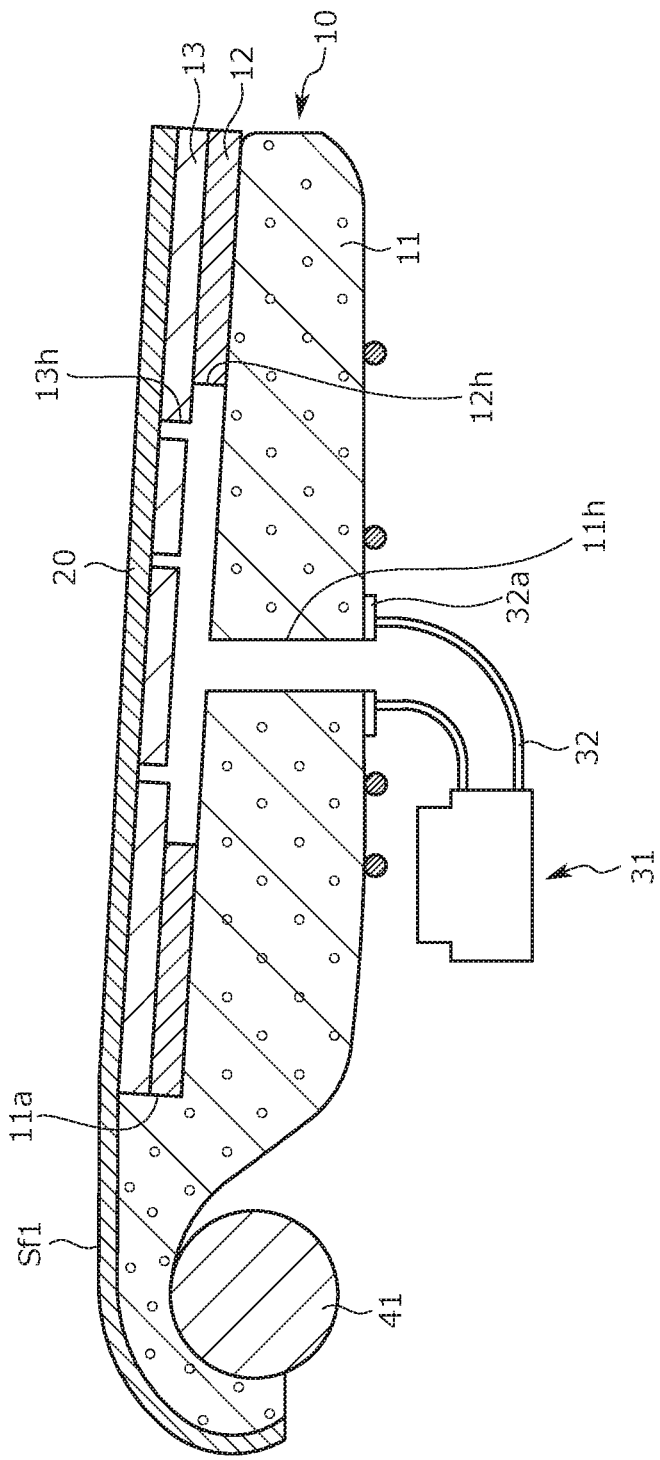
FIG. 9 is a side cross-sectional view of the seat cushion, which is a diagram illustrating a cross-section X-X of FIG. 7.
Figure 10:
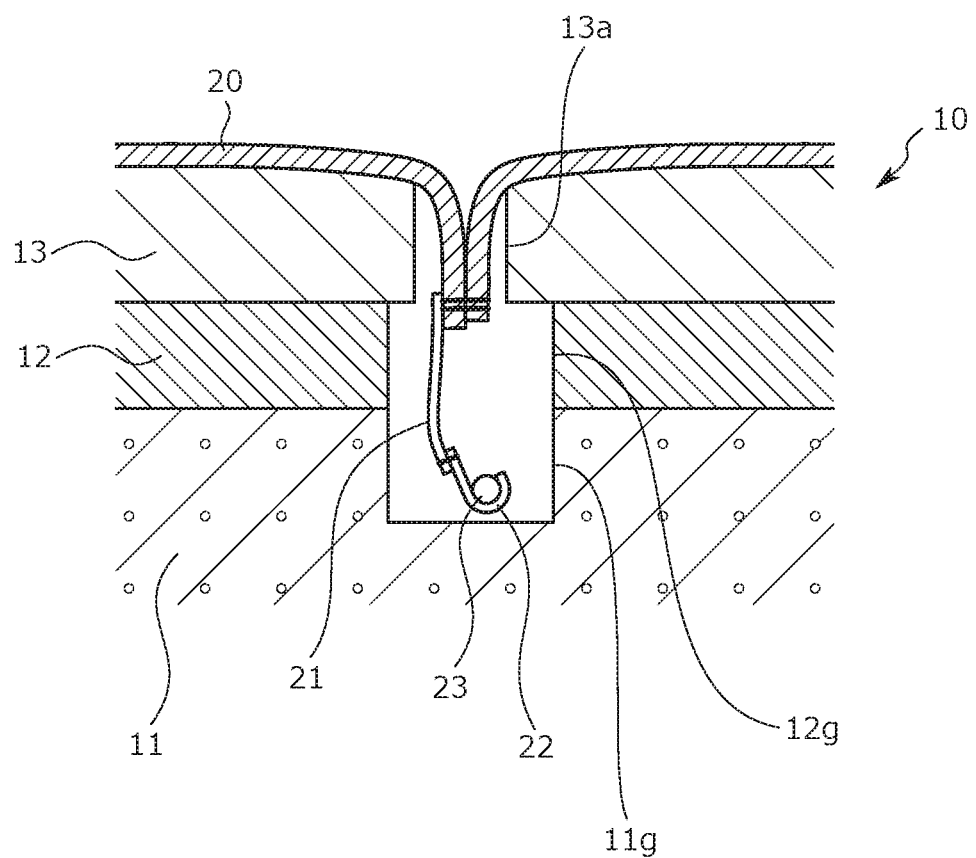
FIG. 10 is a diagram illustrating a cross-section of the seat cushion at a skin pull-in position, which is a diagram illustrating a cross-section Y-Y of FIG. 7.

Next, a detailed configuration of the seat cushion S1 will be described with reference to FIGS. 7 to 10. FIG. 7 is a plan view of the seat cushion S1. FIG. 8 is a diagram illustrating a state in which the pad member 10 is disassembled into pad pieces. FIG. 9 is a side cross-sectional view of the seat cushion S1, which is a diagram illustrating a cross-section X-X of FIG. 7. Additionally, a device (for example, the fan 31) other than the pad member 10 is simply illustrated in FIG. 9. FIG. 10 is a diagram illustrating a cross-section at a skin pull-in position of the seat cushion S1, which is a diagram illustrating a cross-section Y-Y of FIG. 7.

The seat cushion S1 is formed by placing the pad member 10 on the seat cushion frame f1 illustrated in FIG. 2 and covering the pad member with the skin 20. Further, a part of the skin 20 is suspended in the pad member 10 so that a predetermined tension is applied to the skin 20. Specifically, as illustrated in FIG. 7, the skin 20 is suspended at each of two pull-in positions (hereinafter, front pull-in positions Vf) provided in the front end portion of the seat cushion S1 and two pull-in positions (hereinafter, back pull-in positions Vb) provided in the back end portion of the seat cushion S1.

When describing the pad member 10 of the seat cushion S1 according to the embodiment, the pad member 10 is divided into a plurality of pad pieces in the thickness direction (specifically, the up to down direction) as illustrated in FIG. 8. In the embodiment, the pad member 10 for the seat cushion S1 is formed by overlapping three pad pieces. Additionally, the number of the pad materials constituting the pad member 10 is not particularly limited and may be two or more (for example, a pad piece corresponding to an upper pad 13 to be described later may not be provided). Further, the material of each of the three pad pieces constituting the pad member 10 may be the same as each other or may be different from each other.

Three pad pieces constituting the pad member 10 are arranged in order of the base pad 11, an intermediate pad 12, and the upper pad 13 from below. The base pad 11 located at the lowest position corresponds to a first pad piece and is thicker than the other pad pieces. A center portion of the base pad 11 (a center portion in the seat width direction) has a substantially rectangular shape in plan view and extends in the front to back direction. Both end portions of the base pad 11 are raised upward and constitute a bank provided at a side end portion of the seat cushion S1.

A front end portion of the center portion of the base pad 11 in the seat width direction (hereinafter, simply referred to as a front end portion) protrudes forward in relation to the intermediate pad 12 and the upper pad 13 when the intermediate pad 12 and the upper pad 13 are overlapped on the base pad 11 as illustrated in FIG. 9. Then, as illustrated in FIG. 9, the front end portion of the base pad 11 is wound on the rotation shaft 41 of the longitudinal cushion length adjustment unit 40. That is, the front end portion of the base pad 11 is attached to the rotation shaft 41 and is deformed so that the longitudinal length of the pad member 10 changes when the rotation shaft 41 moves forward and backward in a rotation state (simply, the winding amount around the rotation shaft 41 changes).

Further, in the base pad 11, a step is formed at a position slightly behind a portion wound on the rotation shaft 41 and a portion located behind the step is lower than a portion located in front of the step. In other words, in the base pad 11, a portion located behind the step is recessed downward so as to form the recess 11a as illustrated in FIGS. 8 and 9. The recess 11a is formed so as to fit the intermediate pad 12 when overlapping the intermediate pad 12 on the base pad 11. In the embodiment, the depth of the recess 11a is slightly larger than the thickness of the intermediate pad 12.

The intermediate pad 12 corresponds to a second pad piece and overlaps the base pad 11 at a position above the base pad 11 (in other words, a position close to the support surface Sf1 of the seat cushion S1). Additionally, the intermediate pad 12 overlaps on the base pad 11 while being fitted into the recess 11a formed in the base pad 11 as illustrated in FIG. 9.

The intermediate pad 12 has a substantially rectangular shape in plan view and extends in the front to back direction. The intermediate pad 12 is shorter than the center portion in the seat width direction of the base pad 11 in the front to back direction and has substantially the same width as that of the center portion in the seat width direction of the base pad 11 in the seat width direction.

The upper pad 13 is overlapped on the intermediate pad 12. The upper pad 13 has a substantially rectangular shape in plan view and has substantially the same size as that of the intermediate pad 12 (the upper pad has substantially the same longitudinal length and lateral width as those of the intermediate pad 12). Additionally, in the embodiment, the upper pad 13 is divided into a plurality of parts as illustrated in FIG. 8. More specifically, the upper pad 13 is provided with a pair of right and left division lines 13a at the center of the upper pad 13 in the seat width direction. Each division line 13a continuously extends from the front end to the back end of the upper pad 13 and is curved substantially in an S shape. The upper pad 13 is divided into three parts by forming a pair of such division lines 13a on the upper pad 13.

As illustrated in FIG. 8, air passage holes 11h, 12h, and 13h through which air (wind) sent by the blowing unit 30 can pass are respectively formed in the base pad 11, the intermediate pad 12, and the upper pad 13 constituting the pad member 10. Each of the air passage holes 11h, 12h, and 13h penetrates each pad piece in the thickness direction of the pad member 10 (the up to down direction).

More specifically, in the base pad 11, a substantially oval air passage hole 11h which is formed substantially at the center position in the front to back direction is formed so as to penetrate the base pad 11. Additionally, as illustrated in FIG. 9, the flange 32a provided in the front end portion of the duct 32 of the blowing unit 30 is connected to a lower end opening of the air passage hole 11h formed in the base pad 11. Precisely, the upper surface of the flange 32a contacts the lower surface of the base pad 11 while the air passage hole 11h and the through-hole formed at the center portion of the flange 32a communicate with each other.

In the intermediate pad 12, the air passage hole 12h having a shape simulating a symbol is formed so as to penetrate the intermediate pad 12 over a wide range of the intermediate pad 12. Specifically, a through-hole having a U shape in plan view and formed in the front end portion of the intermediate pad 12 and a through-hole substantially having a cross shape in plan view and formed right below the U-shaped through-hole constitute the air passage hole 12h.

A plurality of circular air passage holes 13h are formed in the upper pad 13 so as to be dotted in the upper pad 13.

Then, in the pad member 10 formed by overlapping the base pad 11, the intermediate pad 12, and the upper pad 13, as illustrated in FIG. 9, the air passage holes 11h, 12h, and 13h communicate with each other in the up to down direction. In other words, the base pad 11, the intermediate pad 12, and the upper pad 13 constituting the pad member 10 are overlapped so that the air passage holes 11h, 12h, and 13h communicate with each other.

Further, in each of the base pad 11, the intermediate pad 12, and the upper pad 13, a groove or hole for suspending the skin 20 in the pad member 10 is formed at a position different from the air passage holes 11h, 12h, and 13h.

Specifically, a pull-in groove 11g is formed in a portion corresponding to the front pull-in position Vf and the back pull-in position Vb in the base pad 11. Further, the pull-in groove 11g which is a through-hole is formed in a portion corresponding to the front pull-in position Vf and the back pull-in position Vb in the intermediate pad 12.

Then, in the pad member 10 formed by overlapping the base pad 11, the intermediate pad 12, and the upper pad 13, as illustrated in FIG. 10, the pull-in groove 11g and a pull-in hole 12g communicate with each other. Further, a gap between the portions constituting the upper pad 13, that is, the division line 13a is disposed at a position right above the pull-in hole 12g. A part of the skin 20 constituting the seat cushion S1 is suspended by using the pull-in groove 11g, the pull-in hole 12g, and the division line 13a.

Additionally, a general pull-in method can be used as a method of suspending the skin 20 in the pad member 10. Specifically, as illustrated in FIG. 10, a trim cord 21 is sewn to a suspended portion (specifically, a portion where terminal portions of the skin 20 are sewn together) in the skin 20. The trim cord 21 corresponds to a pull-in member. Precisely, the trim cord 21 is a cloth member attached to a part of the skin 20 in order to suspend a part of the skin 20. The trim cord 21 enters the division line 13a, the pull-in hole 12g, and the pull-in groove 11g along a part of the skin 20 having the trim cord 21 attached thereto.

Further, a J-shaped hook 22 is attached to the end portion of the trim cord 21 (the end portion opposite to the attachment side to the skin 20). The hook-shaped portion of the hook 22 is hung on a portion exposed in the pull-in groove 11g in a hanging wire 23 buried in the bottom portion of the pull-in groove 11g in the base pad 11. Accordingly, apart of the skin 20 is suspended in the pad member 10 and the trim cord 21 attached to a part of the skin 20 is fixed while entering the pull-in groove 11g and the pull-in hole 12g.

Incidentally, in the embodiment, the pad pieces (specifically, the base pad 11, the intermediate pad 12, and the upper pad 13) overlapped to constitute the pad member 10 are bonded to each other by an adhesive. However, when the pad pieces are bonded to each other only by an adhesive, for example, the body of the seated occupant sitting on the vehicle seat S may move. Accordingly, when a load in the front to back direction is applied to the pad member 10 of the seat cushion S1, there is a possibility that one pad piece may be displaced with respect to the other pad piece. When the pad pieces are displaced, the air passage holes 11h, 12h, and 13h respectively formed in the pad pieces are displaced. As a result, there is concern that air sent from the fan 31 cannot appropriately pass through the pad member 10.

Further, in a configuration in which the longitudinal cushion length can be changed by the longitudinal cushion length adjustment unit 40, the front end portion of the base pad 11 is deformed when changing the longitudinal cushion length. For this reason, the pad pieces are easily displaced (precisely, the intermediate pad 12 is displaced with respect to the base pad 11 in the front to back direction). Accordingly, the above-described problems become more significant in a configuration in which the longitudinal cushion length can be changed by the longitudinal cushion length adjustment unit 40.

In contrast, in the embodiment, it is possible to appropriately suppress the displacement between the pad pieces and to satisfactorily maintain a state in which the air passage holes 11h, 12h, and 13h formed in the respective pad pieces communicate with each other. Specifically, in the intermediate pad 12, the pull-in hole 12g is provided at a position different from the air passage hole 12h. The pull-in hole 12g corresponds to a concave portion and becomes a through-hole penetrating the intermediate pad 12 in the thickness direction of the pad member 10.

Further, the base pad 11 is provided with the pull-in groove 11g which communicates with the pull-in hole 12g. The pull-in groove 11g corresponds to a communication concave portion and is formed in the thickness direction of the pad member 10.

Then, the intermediate pad 12 can be overlapped on the base pad 11 while the air passage hole 11h of the base pad 11 communicates with the air passage hole 12h of the intermediate pad 12. In such a state, the pull-in hole 12g communicates with the pull-in groove 11g. Further, the upper pad 13 can be overlapped on the intermediate pad 12 while the air passage hole 12h of the intermediate pad 12 communicates with the air passage hole 13h of the upper pad 13. In such a state, the division line 13a formed in the upper pad 13 communicates with the pull-in hole 12g.

As described above, the skin 20 covers the surface of the pad member 10 formed by overlapping the intermediate pad 12 and the upper pad 13 on the base pad 11. Further, the trim cord 21 attached to a part of the skin 20 enters the pull-in groove 11g, the pull-in hole 12g, and the division line 13a communicating with each other so as to suspend a part of the skin.

In the embodiment, as described above, the trim cord 21 enters the pull-in groove 11g, the pull-in hole 12g, and the division line 13a in a state in which the intermediate pad 12 and the upper pad 13 are overlapped on the base pad 11 so that the air passage holes 11h, 12h, and 13h communicate with each other. Accordingly, the position of the intermediate pad 12 with respect to the base pad 11 is held at the position when the air passage holes 11h, 12h, and 13h communicate with each other. That is, in the embodiment, the trim cord 21 functions as a position holding member that holds the position of the intermediate pad 12 with respect to the base pad 11.

Additionally, in the embodiment, two pull-in grooves 11g are provided in each of the front end portion and the back end portion of the base pad 11 and the pull-in hole 12g is provided in the front end portion and the back end portion of the intermediate pad 12 so as to correspond thereto. Then, the trim cord 21 which is a position holding member enters each of the pull-in groove 11g and the pull-in hole 12g. Accordingly, it is possible to more efficiently hold the position of the intermediate pad 12 with respect to the base pad 11.

Further, the pull-in hole 12g (hereinafter, the back pull-in hole gb) provided in the back end portion of the intermediate pad 12 is located at a position corresponding to the back pull-in position Vb in the seat cushion S1 and extends in the front to back direction as illustrated in FIG. 8. Meanwhile, the pull-in hole 12g (hereinafter, the front pull-in hole gf) provided in the front end portion of the intermediate pad 12 is located at a position corresponding to the front pull-in position Vf in the seat cushion S1 and extends in a direction inclined with respect to the front to back direction as illustrated in FIG. 8. Precisely, the front pull-in hole gf extends outward in the seat width direction as it goes backward.

As described above, the pull-in hole 12g includes the back pull-in hole gb (corresponding to a first portion) and the front pull-in hole gf (corresponding to a second portion) as two kinds of pull-in holes 12g extending in the intersection directions. Then, the trim cord 21 which is a position holding member enters each of the pull-in holes 12g (in other words, both the back pull-in hole gb and the front pull-in hole gf). Accordingly, it is possible to further efficiently hold the position of the intermediate pad 12 with respect to the base pad 11.

Figure 11:
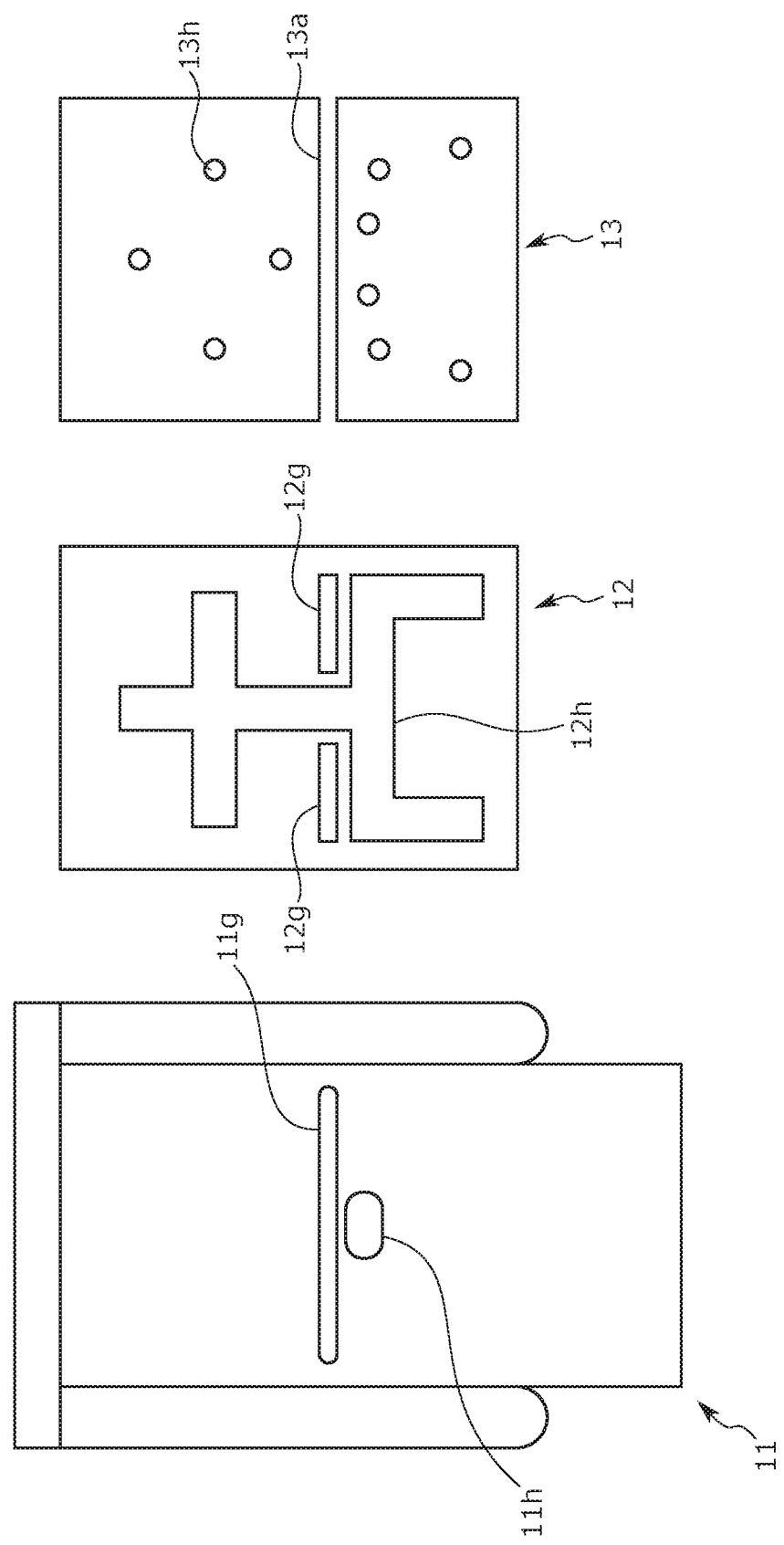
FIG. 11 is a diagram illustrating a modified example of a pad piece constituting a pad member.

While the configuration of the vehicle seat S of the present invention has been described as an example above, the above-described embodiments are merely examples and other examples can be also considered. For example, in the above-described embodiments, the pull-in hole 12g (precisely, the back pull-in hole gb and the front pull-in hole gf) formed in the intermediate pad 12 extends in the front to back direction or a direction inclined with respect to the front to back direction. However, the present invention is not limited thereto and as illustrated in FIG. 11, the pull-in hole 12g may extend in the seat width direction. FIG. 11 is a diagram illustrating a modified example of the pad piece constituting the pad member 10, which is a diagram illustrating each pad piece when viewed from above. Additionally, as illustrated in FIG. 11, the pull-in groove 11g of the base pad 11 and the division line 13*a* of the upper pad 13 may extend in the seat width direction so as to correspond to the pull-in hole 12*g*.

In the seat cushion S1 formed by overlapping the pad pieces illustrated in FIG. 11, the trim cord 21 entering the pull-in groove 11*g* and the pull-in hole 12*g* also preferably extends in the seat width direction. In that case, the displacement of the intermediate pad 12 in the front to back direction can be effectively suppressed by the pull-in hole 12*g* and the trim cord 21 extending in the seat width direction intersecting the front to back direction.

Further, in the above-described embodiment, since the position of the intermediate pad 12 with respect to the base pad 11 is held, the skin pull-in trim cord 21 enters the pull-in hole 12*g* formed in the intermediate pad 12. However, the present invention is not limited thereto and the position of the intermediate pad 12 with respect to the base pad 11 may be held by providing a concave portion other than the pull-in hole 12*g* in the intermediate pad 12 and inserting a protrusion portion (not illustrated) protruding from the seat cushion frame f1 into the concave portion.

Further, in the above-described embodiment, the vehicle seat S in which the longitudinal cushion length adjustment unit 40 is provided so that the longitudinal cushion length can be changed has been described as an example. In such a configuration, since the front end portion of the base pad 11 is deformed when changing the longitudinal cushion length, the intermediate pad 12 is easily displaced with respect to the base pad 11. For this reason, the effect of the present invention of satisfactorily holding the position of the intermediate pad 12 with respect to the base pad 11 becomes significant. However, the present invention is not limited thereto and can be also applied to the vehicle seat S in which the longitudinal cushion length adjustment unit 40 is not provided so that the longitudinal cushion length cannot be changed.

Further, in the above-described embodiment, in a configuration in which the pad member 10 of the seat cushion S1 is divided into a plurality of pad pieces, the displacement of one pad piece (specifically, the intermediate pad 12) of them is suppressed. However, the present invention is not limited thereto and can be also applied to the case of suppressing the displacement of one pad piece of them in a configuration in which the pad material of the seat back S2 is divided into a plurality of pad pieces.

REFERENCE SIGNS LIST

10: pad member
11: base pad (first pad piece)
   11*a*: recess
   11*g*: pull-in groove (communication hole, communication concave portion)
   11*h*: air passage hole
12: intermediate pad (second pad piece)
   12*g*: pull-in hole (concave portion, through-hole)
   12*h*: air passage hole
13: upper pad
   13*h*: air passage hole
   13*a*: division line
20: skin
21: trim cord
22: hook
23: hanging wire
30: blowing unit
31: fan (blower)
32: duct
   32*a*: flange
33: fan mounting bracket
40: longitudinal cushion length adjustment unit
41: rotation shaft
42: shaft support bracket
43: reciprocating rod
44: guide pillar
45: motor
46: pillar mounting bracket
gb: back pull-in hole (first portion)
gf: front pull-in hole (second portion)
f1: seat cushion frame
S: vehicle seat (conveyance seat)
   S1: seat cushion
   S2: seat back
   S3: headrest
Sf1, Sf2: support surface
Vb: back pull-in position
Vf: front pull-in position

The invention claimed is:

1. A conveyance seat with a support surface supporting a seated occupant, comprising:
    a pad member including a first pad piece and a second pad piece overlapped on the first pad piece at a position closer to the support surface than the first pad piece;
    a blower provided so that air passes through the pad member;
    an air passage hole formed in each of the first pad piece and the second pad piece to penetrate in a thickness direction of the pad member and allowing air sent by the blower to pass therethrough;
    a concave portion provided at a position different from the air passage hole in the second pad piece;
    a position holding member entering the concave portion while the second pad piece is overlapped on the first pad piece so that the air passage hole of the first pad piece communicates with the air passage hole of the second pad piece to hold a position of the second pad piece with respect to the first pad piece; and
    a movement member configured to move in an intersection direction intersecting the thickness direction to change a length of the pad member in the intersection direction,
    wherein a front end portion of the first pad piece in the intersection direction is attached to the movement member and is deformed so that the length is changed in accordance with a movement of the movement member,
    wherein the first pad piece is provided with a recess formed to fit the second pad piece thereinto, the recess being formed at a back of the front end portion of the first pad piece that covers an outer peripheral portion of the movement member, and
    wherein the second pad piece is overlapped on the first pad piece while the second pad piece is fitted into the recess.

2. The conveyance seat according to claim 1, further comprising:
    a skin covering the pad member,
    wherein the concave portion is a pull-in hole formed in the second pad piece to suspend a part of the skin,
    wherein the position holding member is a pull-in member attached to a part of the skin to suspend a part of the skin in the pull-in hole, and
    wherein the pull-in member is fixed while entering the pull-in hole.

3. The conveyance seat according to claim 1, further comprising:
a duct connected to the blower and forming a flow passage of air sent by the blower,
wherein a front end portion of the duct is located outside the pad member and is connected to an opening of the air passage hole of the first pad piece.

4. The conveyance seat according to claim 1, wherein the intersection direction is a front to back direction of the conveyance seat, and
wherein the concave portion and the position holding member extend in a width direction of the conveyance seat.

5. The conveyance seat according to claim 1,
wherein the intersection direction is a front to back direction of the conveyance seat,
wherein the concave portion includes a first portion extending in the front to back direction and a second portion extending in a direction inclined with respect to the front to back direction, and
wherein the position holding member enters each of the first portion and the second portion.

6. The conveyance seat according to claim 1,
wherein the concave portion is a through-hole penetrating the second pad piece in the thickness direction,
wherein the first pad piece is provided with a communication concave portion formed in the thickness direction and communicating with the through-hole,
wherein the communication concave portion communicates with the through-hole while the second pad piece is overlapped on the first pad piece so that the air passage hole of the first pad piece communicates with the air passage hole of the second pad piece, and
wherein the position holding member enters both the communication concave portion and the through-hole communicating with each other.

7. A method for manufacturing a conveyance seat having a pad member including a first pad piece and a second pad piece, comprising:
providing a blower for blowing air through the pad member;
providing a movement member configured to move in an intersection direction intersecting a thickness direction of the pad member to change a length of the pad member in the intersection direction;
providing the first pad piece, wherein the first pad piece includes an air passage hole formed to penetrate in the thickness direction of the pad member and allowing air sent by the blower to pass therethrough, a front end portion covering an outer peripheral portion of the movement member, and a recess formed to fit the second pad piece thereinto;
providing the second pad piece, wherein the second pad piece includes an air passage hole formed to penetrate in the thickness direction of the pad member and allowing air sent by the blower to pass therethrough and a concave portion provided at a position different from the air passage hole in the second pad piece;
attaching the front end portion of the first pad piece to the movement member to cover an outer peripheral portion of the movement member with the front end portion of the first pad piece;
overlapping the second pad piece on the first pad piece so that the air passage hole of the first pad piece communicates with the air passage hole of the second pad piece and fitting the second pad piece into the recess of the first pad piece; and
entering a position holding member into the concave portion of the second pad piece to hold a position of the second pad piece with respect to the first pad piece.

* * * * *